Jan. 23, 1951 W. L. GRANNAN 2,539,073
MEASURING AND DISPENSING DEVICE
Filed Sept. 12, 1946 2 Sheets-Sheet 1
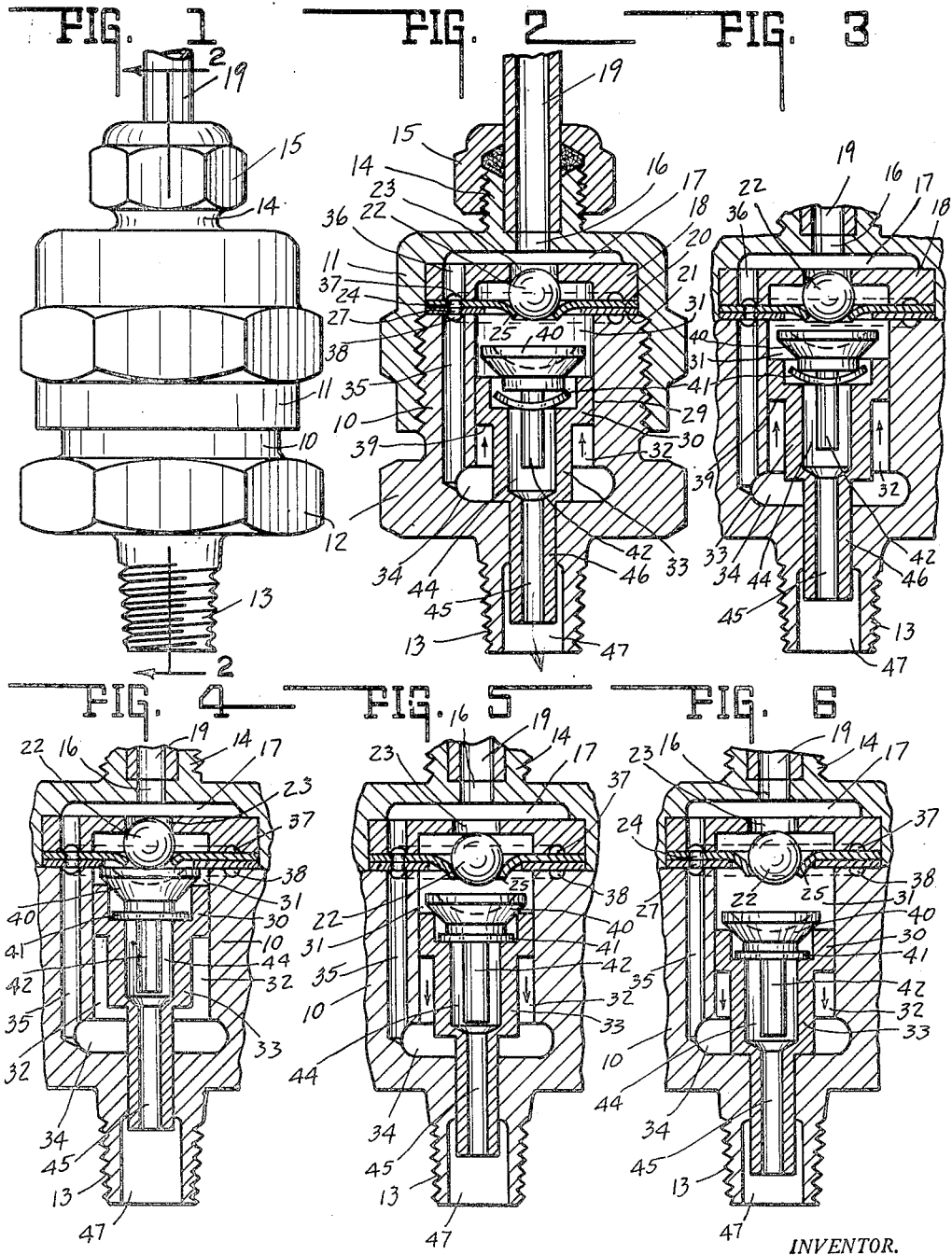
INVENTOR.
WILLIAM LOUIS GRANNAN,
BY
Lockwood, Goldsmith & Galt,
ATTORNEYS.

Jan. 23, 1951 W. L. GRANNAN 2,539,073
MEASURING AND DISPENSING DEVICE
Filed Sept. 12, 1946 2 Sheets—Sheet 2
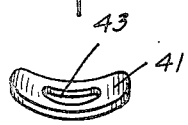
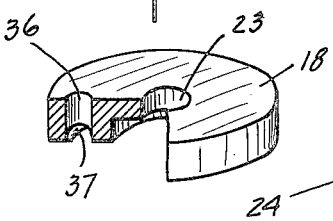
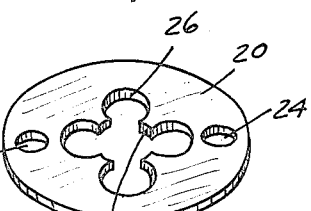
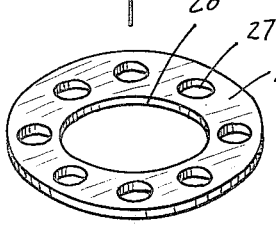
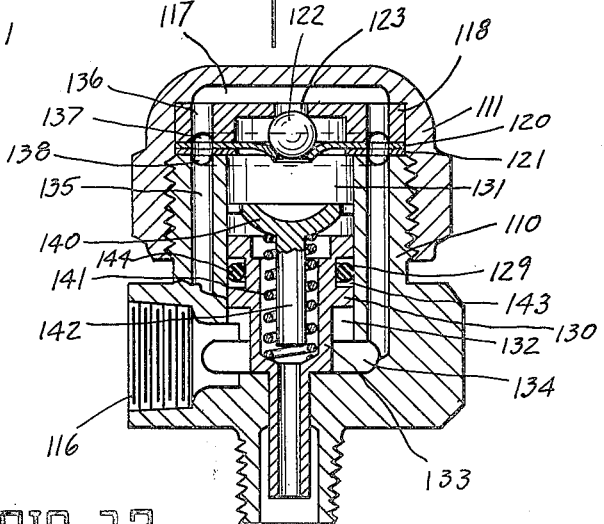
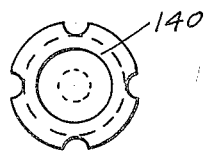
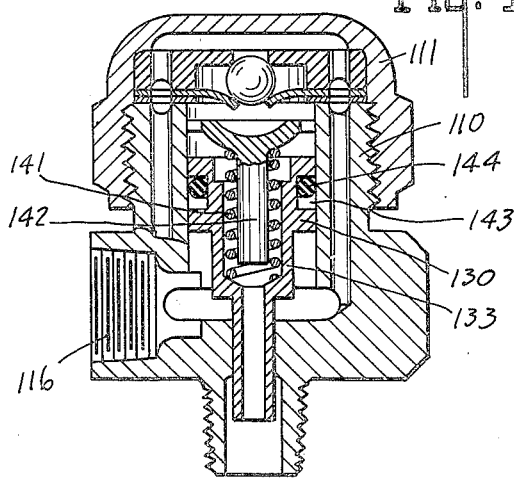
INVENTOR.
WILLIAM LOUIS GRANNAN,
BY
Lockwood, Goldsmith & Galt,
ATTORNEYS.

Patented Jan. 23, 1951

2,539,073

UNITED STATES PATENT OFFICE 2,539,073

MEASURING AND DISPENSING DEVICE

William Louis Grannan, Des Plaines, Ill., assignor of three-fourths to Mildred A. Grannan, Des Plaines, Ill.

Application September 12, 1946, Serial No. 696,491

14 Claims. (Cl. 184—7)

This invention relates to an automatic measuring and dispensing device for metering and dispensing a predetermined quantity of a liquid including a material capable of flowing, such as oil or grease, by hydraulic pressure as the pressure and volume of the material is being increased. The pressure may be applied from any suitable source by a manual or automatically operated pump through tubing or pipe to the measuring device.

The object of the invention is to provide a measuring and dispensing device that is completely enclosed and actuated by the pressure of the material being metered and dispensed through its cycle of operation.

Another object of the invention is to provide a measuring and dispensing device whereby should a leakage of the material from the pressure chamber occur past the piston rod during the operation of said device, such leakage will mix with the metered dispensed material, preventing the wasting thereof.

Another object of the invention is to provide a measuring and dispensing device whereby the parts can be made economically and accurately on automatic machinery thus making a complete assembly that correctly meters and costs little to produce.

Another object of the invention is to provide a measuring and dispensing device whereby the same assembly may be used in accurately metering and dispensing a material when the temperaturer of the said material may vary considerably due to temperature change.

These objects are attained by mechanism illustrated in the accompanying drawings, other objects and advantages of the invention being apparent from the following description, reference being had to the accompanying drawings.

The full nature of the invention will be understood from the accompanying drawings and the following description and claims:

Fig. 1 is a side elevation of the device.

Fig. 2 is a vertical sectional view taken on the line 2—2 of Fig. 1, showing the mechanisms in their normal positions.

Fig. 3 is a view similar to Fig. 2 with parts removed, showing the mechanisms in their respective positions when the piston assembly has completed approximately one-half of its dispensing stroke.

Fig. 4 is a view similar to Fig. 3 showing the mechanisms in their respective positions after completion of the piston assembly dispensing stroke.

Fig. 5 is a view similar to Fig. 3 showing the mechanisms in their respective positions when the piston assembly has completed approximately one-half of its downward stroke in returning to normal position.

Fig. 6 is a view similar to Fig. 3 showing the mechanisms in their respective positions when the piston assembly has completed its stroke just prior to the mechanisms completing their cycle and return to normal position.

Fig. 7 is a perspective view of the piston check valve spring showing it in its normal position, said spring being flat when under load.

Fig. 8 is a perspective view of the ball check valve plate with a portion thereof in section.

Fig. 9 is a perspective view of the ball check valve spring in its normal position.

Fig. 10 is a perspective view of the sealing gasket.

Fig. 11 is a plan view of the piston valve of Figs. 12 and 13.

Fig. 12 is similar to Fig. 2, showing a modified form of the mechanisms in their normal position.

Fig. 13 is the same as Fig. 12 showing the mechanisms in their respective positions when the piston assembly has completed approximately one half of its dispensing stroke.

One form of the invention, as shown in Figs. 1 to 10, inclusive, comprises a fitting having a main body 10 externally threaded to receive an internally threaded cap 11 enclosing the upper portion thereof and provided with a hex portion 12 terminating in an externally threaded boss 13. The cap 11 is provided with an upwardly extending externally threaded neck portion 14 to receive a packing nut 15.

The cap 11 is provided with a central bore 16 communicating with a supply chamber 17 comprising a space between a ball check valve plate 18 and the upper surface of the cap. In communication with the bore 16 there is a supply tube 19 for receiving liquid such as oil or grease from a pressure pump or like source of supply, not shown.

The ball check valve plate 18 is clamped against the upper edge of the body 10 by the cap 11 with a ball check valve spring 20 and a gasket 21 interposed therebetween. The spring 20, as illustrated in Fig. 9, yieldingly retains a ball check valve 22 against the valve seat of an intake port 23 in the valve plate 18. Said intake port is in alignment with the supply tube 19 and port 16, being open to the chamber 17.

The valve spring 20, as illustrated in Fig. 9, is provided with the ports 24 adjacent the periphery thereof. Centrally, said spring has a clover leaf opening forming the inwardly extending yielding tongues 25 and the intermediate ports 26. The gasket 21, as shown in Fig. 10, is provided with an annular series of ports 27 corresponding and adapted to register with the ports 24, said gasket having a central opening indicated at 28 surrounding the ports 26 of the spring 20 when they are associated.

The body 10 is formed with a central cylinder 29 in which a metering piston 30 is adapted to reciprocate. Said piston separates the cylinder 29 into a metering chamber 31 at the top of the piston and a pressure chamber 32 below the piston. Said pressure chamber 32 surrounds a reduced portion 33 of the piston, occupying the space between said reduced portion and the cylinder 29. It is in communication with a gallery 34 comprising an enlargement of the lower end of the cylinder 29. Said gallery is in communication with a passage 35 formed in the body to one side of the cylinder 29.

The passage 35 is in communication with a port 36 in the ball check valve plate 18, as shown in Fig. 8, through the ports 24, 27 of the spring 20 and gasket 21, respectively. For this purpose the plate 18 is formed with an annular groove 37 in its under surface communicating with the port 36, and the upper edge of the body 10 is provided with a corresponding annular groove 38 in communication with the passage 35 and ports 24, 27. Thus, tube 19 is at all times in communication with the pressure chamber 32 through the supply chamber 17, port 36, grooves 37, 38, ports 24, 27, passage 35 and gallery 34. Liquid pressure and supply through the tube 19 is thereby transmitted at all times to the pressure chamber 32 to exert an upward pressure in the cylinder 29 or pressure chamber 32 against the piston pressure surface indicated at 39.

The piston 30 is recessed to carry a check valve 40, which is normally held in open position by a spring disk 41, as shown in Fig. 7. Said valve is guided by a valve stem 42 extending through an aperture 43 in said spring. Said valve is in alignment with and extends toward the ball valve 22 and its spring 20. The piston has its reduced portion 33 formed with a discharge passage 44 communicating with an outlet passage 45 extending downwardly through its guide stem 46 into the outlet port 47 of the threaded neck 13.

The invention contemplates pressure operation to meter a "one shot" charge of lubricant or other liquid, including a semi-liquid such as grease, to lubricate such part or parts of a mechanism as may be connected with the outlet port 47. The volume capacity of the metering chamber 31 controls the quantity of liquid to be dispensed during one cycle of operation of the mechanisms, and regardless of the extent or duration of the pressure applied at the source of the supply. This is accomplished entirely through differential pressure areas controlling the reciprocation of the metering piston in the following manner.

With the mechanisms in normal position, as shown in Fig. 2, all passageways, ports, chambers and the like, will be filled with the liquid. The metering piston is in its lowermost position, the ball check valve 22 being closed under tension of its spring, and the piston check valve 40 opened under the tension of its spring. The mechanisms, therefore, will be in balanced condition. Pressure applied at the source will be exerted against the underside of the piston 39 through the pressure chamber 32. This will move the piston through the metering chamber 31, since with the valve 40 open there will be no resistance by the liquid contained therein which has free passage past the valve 40 to the part being lubricated.

Fig. 3 is illustrative of the relation of the mechanism during the metering operation as the piston is forced upwardly in the direction of the arrows. Upon the metering piston reaching its extreme upper position, as shown in Fig. 4, it will have forced a metered quantity of liquid from the chamber 31 and its valve 40 will abut the gasket 21, being thereby forced to closed position against the tension of its spring 41. In this position, the dispensing of a metered quantity of the liquid will have been completed and with the valve closed no more liquid will be permitted to pass through the piston.

With continued pressure being exerted, its only outlet is through the ball check valve 22, overcoming the tension of the yielding tongues 25. The opening of the ball valve permits the liquid to replenish and recharge the metering chamber 31. The pressure of the incoming liquid past the ball valve is then exerted over the entire area of the top of the piston and its valve which is greater than the area 39 at the bottom thereof. The pressure exerted on the greater area, therefore, overcomes the pressure on the area 39, forcing the piston in the reverse direction, as shown by arrows in Fig. 5, until it reaches its lowermost position (Fig. 6). The ball check valve 22 will close by the action of the spring 20 since the lubricant pressures on opposite sides of the valve will be equal. In this position, the pressure is neutralized, liquid in the metering chamber being prevented from discharging through the piston due to the fact that the pressure on its valve has overcome the tension of its spring and closed it. The piston cannot be moved in the upward direction because of the greater pressure on the top than on the bottom. This condition continues until pressure at the source is released, whereupon the pressure, being reduced in the pressure chamber 32, will develop a difference of pressure between the metering chamber 31 and the said pressure chamber. The higher pressure in the metering chamber will be lowered due to a slight clearance between the piston 30 and the cylinder bore, then when the pressure in the metering chamber 31 is sufficiently low enough the spring 41 will open the piston valve 40. The mechanisms of the device will then be in their normal position, as shown in Fig. 2, with the metering chamber and all other chambers, passageways and ports filled with liquid ready for the next application of pressure.

In the modified form of the invention, as shown in Figs. 12 and 13, the body 110 receives a threaded closure cap 111 which clamps the ball check plate 118 against the top of the body with the ball check valve spring 120 and apertured gasket 121 therebetween. The lower part of the body 110 is provided with the inlet 116 internally threaded for receiving a pressure line from a source of liquid pressure.

The plate 118 is provided with a central port 123 providing a valve seat for the ball check valve 122 yieldingly retained in closed position under tension of the spring plate 120, as above described. The body is provided with a cylinder 129 in which the piston 130 is adapted to reciprocate, said piston separating the metering chamber 131 at the top thereof and the pressure chamber 132 at the bottom thereof.

The pressure intake 116 is in communication with the gallery 134 which communicates with the pressure chamber 132 and the passages 135 leading to the upper pressure chamber 117 through the ports 136 in the plate 118 and the communicating grooves and ports through the spring 120 and gasket 121.

The piston 130 is provided with the piston valve 140 having peripheral ports and adapted to seat upon the piston against the tension of the coil pressure spring 141 carried within the central bore of the piston to surround the valve stem 142. The piston is also formed with a ring groove 143 in which a piston ring 144 is mounted.

Said ring is preferably of resilient material, such as rubber, and circular in cross section. It is held in sealing relation with the wall of the cylinder under sufficient compression to act as a packing and prevent fluid passage past the piston. But the ring groove 143 is substantially wider than the ring to perimt it to slip to different positions therein (Figs. 12, 13).

The mechanisms of this modification are substantially the same as above described, operating in the same manner and under the same principle. The mechanisms are in normal positions under atmospheric pressure, as shown in Fig. 12, comparative with their positions as in Fig. 2. Upon application of pressure at 116, since the valve 140 is normally open, the pressure will be applied against the underside of the piston, forcing it upwardly to cause the lubricant in the metering chamber 131 to be discharged therethrough. During the action the ring 144 will be forced to its upper position as in Fig. 13. On the piston reaching the end of its stroke, the valve 140 will be closed in the manner above described against the tension of its spring 141. Continued pressure, having no other outlet will then cause the ball check valve 122 to open by reason of the liquid under pressure passing through the passageways 135 into the top pressure chamber 117. The liquid pressure will thereupon be exerted against the entire upper surface of the piston, its valve 140 and floating piston ring 144 overcoming the pressure against the lesser area at the underside thereof, whereby the piston will be forced to its lowermost position and the metering chamber refilled with liquid. During this action the high pressure is in both the metering chamber 131 and the pressure chamber 132. Upon the pressure being lowered in the pressure chamber 132, due to the higher pressure in the metering chamber 131 and the clearance between the piston and cylinder, the piston ring 144 will be forced downwardly to its lowermost position, causing an increase in volume above said piston ring. This permits the pressure in the metering chamber 131 to be lowered sufficiently to permit the piston valve 140 to be opened by the spring 141. When the above cycle is completed, the position of the mechanism is such as that shown in Fig. 12 and in readiness for the next dispensing cycle.

From the foregoing, it will be observed that the cycle of operations is wholly dependent upon differential pressure areas with no spring actuation for the metering piston. Of substantial importance, however, is the fact that the mechanisms are wholly contained and enclosed within the body and its cap so as to permit of no disarrangement or interference through entry of foreign matter into the working parts. By reason of this arrangement of the mechanisms and their operation, no part or parts thereof are open to the atmosphere or extend out of or beyond the confining sealed closures of the body and cap.

The invention claimed is:

1. A measuring and dispensing device for pressure feed systems comprising a cylinder, a piston reciprocable therein dividing said cylinder into a metering chamber at one end and a pressure chamber at the other end, said piston having a slight clearance with respect to said cylinder and being provided with a discharge passage therethrough and presenting a greater effective pressure area in said metering chamber than in said pressure chamber, a normally open piston valve in said passage to permit material to be dispensed therethrough from said metering chamber upon said piston being stroked in its metering direction, means for closing said valve at the completion of said stroke, and an inlet to said metering chamber having a normally closed check valve to prevent escape of material therefrom during said metering stroke and permit said material to enter said chamber under pressure upon completion thereof, said inlet and pressure chamber being in communication with the source of material under pressure, whereby the pressure exerted on said piston in said pressure chamber will force it through its metering stroke and upon its valve being closed at the end thereof will open said check valve and be applied to said piston through said metering chamber over a greater piston area to effect its return stroke and refill said metering chamber.

2. A measuring and dispensing device for pressure feed systems comprising a cylinder, a piston reciprocable therein dividing said cylinder into a metering chamber at one end and a pressure chamber at the other end, said piston having a slight clearance with respect to said cylinder, a reduced extension on said piston extending through said pressure chamber, said piston and extension having a discharge passage therethrough, a piston valve controlling said passage normally open under spring tension, a valve controlled intake communicating with said metering chamber, and means in said metering chamber to close said piston valve at the completion of its metering stroke, said intake and pressure chamber being in communication with a pressure source for the material to be dispensed.

3. A measuring and dispensing device comprising a cylinder, a piston reciprocable axially of said cylinder, said piston having a slight clearance with respect to said cylinder, a piston rod extending from one end of said piston through one end of the cylinder, said piston and rod having a discharge passage therethrough, inlets connected with a pressure source for the material to be dispensed in communication with said cylinder on each side of said piston, the inlet on one side thereof having a normally closed check valve, a normally open piston valve in said discharge passage, and means in said cylinder for closing said piston valve upon said piston being forced by pressure from said source through a metering stroke, said pressure acting to open said check valve to force said piston through its return stroke upon closing of said piston valve.

4. A measuring and dispensing device for pressure feed systems comprising a cylinder having a normally closed check valve at one end thereof communicating with a source of material under pressure, a piston reciprocable in said cylinder toward and away from said check valve, said piston having a slight clearance with respect to said cylinder, said piston having a discharge passage therethrough, a normally open piston valve in said passage, and means in said cylinder to close said piston valve upon completion of a metering stroke toward said check valve, said piston being formed with a reduced effective pressure area on the opposite side thereof from said piston valve in communication with said source of material, whereby the pressure exerted on the reduced area of said piston will force it through a metering stroke toward said check valve and upon closing of the piston valve said pressure will open said check valve to apply pressure to said piston in the reverse direction.

5. A measuring and dispensing device for pressure feed systems, comprising a cylinder, a source of material under pressure communicating with both ends of said cylinder, a metering piston reciprocable in said cylinder having a discharge passage extending therethrough communicating with the dispensing end of said device, said piston having a slight clearance with respect to said cylinder, a normally closed check valve controlling the inlet of material to said cylinder on the opposite side of said piston, a normally open piston valve controlling said discharge passage therethrough to permit material in said cylinder to freely by-pass said piston valve as said piston is forced toward said check valve for dispensing the material therebetween, and means in said cylinder for closing said piston valve upon completion of the metering stroke of said piston, the effective pressure area of said piston being greater on the metering side thereof than on the discharge side to permit said check valve to be opened and the piston returned from its metering stroke upon said piston valve being closed.

6. A measuring and dispensing device for pressure feed systems comprising a cylinder having an inlet end and a pressure end both in communication with a source of material under pressure, a metering piston mounted in said cylinder to provide a metering chamber at the inlet end of said cylinder, said piston having a slight clearance with respect to said cylinder, a reduced extension on said piston extending through the pressure end of said cylinder having a discharge passage therethrough, a piston valve in said passage normally open under spring tension, a spring pressed check valve normally closing the inlet to the metering end of said cylinder, and means in said cylinder for closing said piston valve upon said piston completing its movement through a metering stroke effective through pressure exerted on its reduced area about said extension, whereupon the pressure through said inlet will open said check valve to replenish the metering chamber and force said piston through its return stroke through the differential of the pressure areas at its metering end and its reduced extension end.

7. A metering and dispensing device for pressure feed systems comprising a housing having an inlet communicating with a source of material under pressure to be dispensed and an outlet communicating with said pressure feed system, a cylinder in said housing forming a metering chamber at one end and a pressure chamber at the other end, said chambers being in communication with said inlet, a piston reciprocable therein separating said chambers and having a clearance relative to said cylinder, a spring controlled check valve normally closing its connection with said inlet, a reduced extension on said piston extending through said pressure chamber having a stem slidable in said housing, a discharge passage extending through said piston, extension and stem communicating with the outlet of said housing, a spring actuated normally open piston valve in said passage, and means in said metering chamber engageable by said piston valve for closing it upon said piston being forced by pressure exerted in said pressure chamber to completion of its metering stroke during which the material in said metering chamber is forced through said passage, the continued pressure acting to open said check valve to admit a new charge of material to said metering chamber and force its return stroke through the differential effective pressure area thereof, said check valve being spring actuated to closing position and said piston valve being spring actuated to open position upon release of pressure from said source.

8. A measuring and dispensing device for pressure feed systems comprising a cylinder, a piston reciprocable therein with a clearance therebetween and dividing said cylinder into a metering chamber at one end and a pressure chamber at the other end, a reduced extension on said piston extending through said pressure chamber, said piston and extension having a discharge passage therethrough, a piston valve controlling said passage normally open under spring tension, a valve controlled intake communicating with said metering chamber, means in said metering chamber to close said piston valve at the completion of its metering stroke, said piston having a ring groove, and a resilient piston ring carried in said groove for sliding movement axially thereof to release pressure in said metering chamber when the pressure is lowered in said system, said intake and pressure chamber being in communication with a pressure source for the material to be dispensed.

9. A measuring and dispensing device comprising a cylinder, a piston reciprocable axially of said cylinder with a clearance therebetween, a piston rod extending from one end of said piston through one end of the cylinder, said piston and rod having a discharge passage therethrough, inlets connected with a pressure source for the material to be dispensed in communication with said cylinder on each side of said piston, the inlet on the metering side thereof having a normally closed check valve, a normally open piston valve in said discharge passage, means in said cylinder for closing said piston valve upon said piston being forced by pressure from said source through a metering stroke, said piston having a ring groove, and a piston ring carried in said groove and of an axial thickness substantially less than the axial width of said groove to permit movement thereof relative to said piston in one direction upon pressure increase in said system and in the opposite direction when the pressure is lowered therein, said intake and pressure chamber being in communication with a pressure source for the material to be dispensed.

10. A measuring and dispensing device for pressure feed systems comprising a cylinder, a piston reciprocable therein with a clearance therebetween and dividing said cylinder, into a metering chamber at one end and a pressure chamber at the other end, a reduced extension on said piston extending through said pressure chamber, said piston and extension having a discharge passage therethrough, a piston valve controlling said passage normally open under spring tension, a valve controlled intake communicating with said metering chamber, means in said metering chamber to close said piston valve at the completion of its metering stroke, and means carried by said piston for varying the effective capacity of said metering chamber according to the direction in which pressure is exerted on said piston, said intake and pressure chamber being in communication with a pressure source for the material to be dispensed.

11. A measuring and dispensing device for pressure feed systems comprising a cylinder, a piston reciprocable therein with a clearance therebetween and dividing said cylinder into a metering chamber at one end and a pressure chamber at the other end, a reduced extension on said piston extending through said pressure chamber, said piston and extension having a discharge passage therethrough, a piston valve controlling said passage normally open under spring tension, a valve controlled intake communicating with said metering chamber, means in said metering chamber to close said piston valve at the completion of its metering stroke, and a packing ring carried by said piston in sealing engagement with said cylinder movable to different positions relative to said piston in accordance with the changes in direction of pressure exerted thereon, said intake and pressure chamber being in communication with a pressure source for the material to be dispensed.

12. A dispensing lubricator comprising a housing having a chamber to which lubricant is supplied under substantial pressure, a cylinder, a piston movable in the cylinder with a clearance therebetween and having different effective pressure areas, lubricant passages in communication with opposite ends of the cylinder for supplying lubricant from the chamber to the cylinder on opposite sides of the piston for operating the piston on both a dispensing stroke and a recharging stroke by the pressure differential of lubricant applied to opposite sides of said piston, a check valve in one of said passages, a conduit leading through the piston to a bearing that is to be supplied with lubricant, a valve carried by the piston and commanding said conduit, means effective to close said valve upon completion of said dispensing stroke to cause said recharging stroke, and means for moving said valve to open position upon decrease of said lubricant pressure.

13. A dispensing lubricator comprising, in combination, a supply chamber to which liquid is delivered under pressure, a cylinder having a head adjacent said chamber, a piston assembly including a piston movable in the cylinder with a clearance therebetween and having different effective pressure areas, a piston rod extending from one face of the piston and through which there is a passage for the delivery of lubricant from the cylinder as the piston moves toward the head end of the cylinder, said piston having its other face exposed to the pressure of lubricant in said supply chamber, a valve commanding said passage and carried by the piston assembly, a conduit leading to a bearing and having an end portion in which the piston rod slides, means tending to hold the valve open during the movement of the piston toward the head end of the cylinder, means for closing the valve at the end of the lubricant delivery stroke of the piston assembly, a charging port opening into the head end of the cylinder from said supply chamber, and a check valve commanding the charging port for admitting lubricant into the head end of the cylinder after the piston has reached the end of its delivery stroke.

14. A dispensing lubricator comprising a cylinder, a piston movable in the cylinder with a clearance therebetween and having different effective pressure areas, a discharge conduit from the cylinder for the delivery of lubricant to a bearing, a valve commanding the discharge conduit and in position to be closed by movement of the piston as the piston approaches the end of its delivery stroke in the cylinder, a lubricant supply chamber communicating with the cylinder on one side of the piston and from which lubricant under pressure exerts force against the piston to move the piston in one direction for its lubricant delivery stroke, a conduit through which lubricant from said chamber enters the cylinder on the other side of said piston to move the piston in the opposite direction to recharge the cylinder with lubricant in preparation for the next lubricant delivery stroke, and a normally closed check valve commanding the conduit through which lubricant enters the cylinder adapted to prevent lubricant passage therethrough during said delivery stroke.

WILLIAM LOUIS GRANNAN.

REFERENCES CITED

The following references are of record in the file of this patent:

UNITED STATES PATENTS

| Number | Name | Date |
| --- | --- | --- |
| 1,897,609 | Cowles | Feb. 14, 1933 |
| 1,942,097 | Hallerberg | Jan. 2, 1934 |
| 2,005,166 | Roberts | June 18, 1935 |
| 2,029,198 | Ross | Jan. 28, 1936 |
| 2,141,022 | Rotter | Dec. 20, 1938 |
| 2,205,320 | Teal | June 18, 1940 |
| 2,351,930 | Davis | June 20, 1944 |